2 Sheets--Sheet 1.

GEORGE E. WARING, Jr.

Deoderizing Water Closets.

No. 4,803. Reissued March 12, 1872.

*Witnesses:*
E. Wolff.
G. Felbel.

*Inventor:*
George E. Waring.
By att.
J. Mac Intire.

AM. PHOTO-LITHOGRAPHIC CO. N.Y. (OSBORNE'S PROCESS.)

2 Sheets--Sheet 2.

GEORGE E. WARING, Jr.

Deoderizing Water Closets.

No. 4,803. Reissued March 12, 1872.

Witnesses:
E. Wolff.
J. Felbel.

Inventor:
George E. Waring.
By his atty
J. Mac Intire

A.M. PHOTO-LITHOGRAPHIC CO. N.Y. (OSBORNE'S PROCESS.)

UNITED STATES PATENT OFFICE.

GEORGE E. WARING, JR., OF NEWPORT, RHODE ISLAND, ASSIGNOR TO THE EARTH-CLOSET COMPANY, OF HARTFORD, CONNECTICUT.

IMPROVEMENT IN DEODORIZING WATER-CLOSETS.

Specification forming part of Letters Patent No. 90,709, dated June 1, 1869; reissue No. 4,803, dated March 12, 1872.

*To all whom it may concern:*

Be it known that I, GEORGE E. WARING, Jr., of Newport, in the county of Newport and State of Rhode Island, have invented certain new and useful Improvements in Earth-Closets; and I do hereby declare that the following is a full, clear, and exact description thereof, whereby a person skilled in the art can make and use the same, reference being had to the accompanying drawing and to the letters of reference marked thereon.

My invention relates to that kind of earth-closets in which a hopper or supply-receptacle is provided to contain a supply of the powdered earth or other deodorant, and in which there is a suitable mechanism by means of which the excrement deposited may be deodorized by a charge of earth each time the closet is used.

Figure 1:
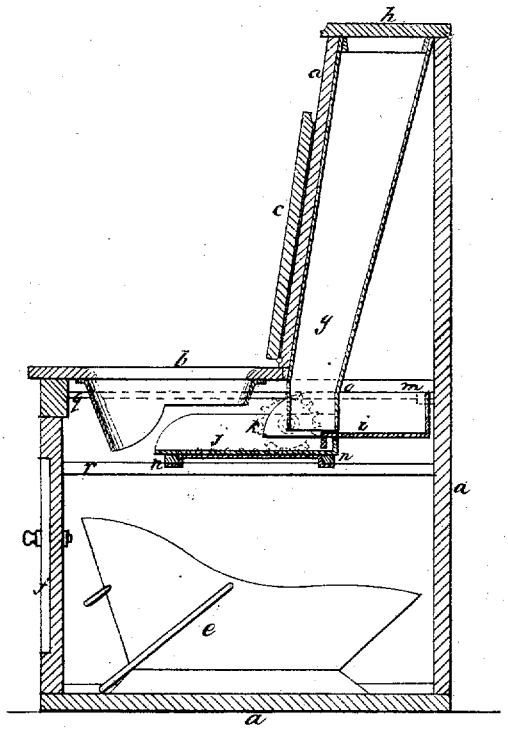
Figure 2:
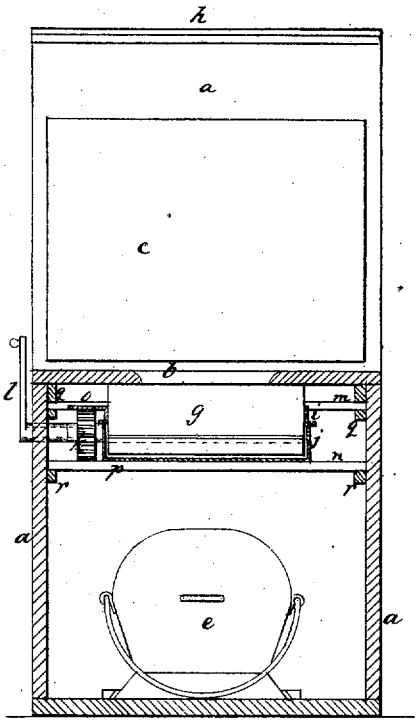
Figure 3:
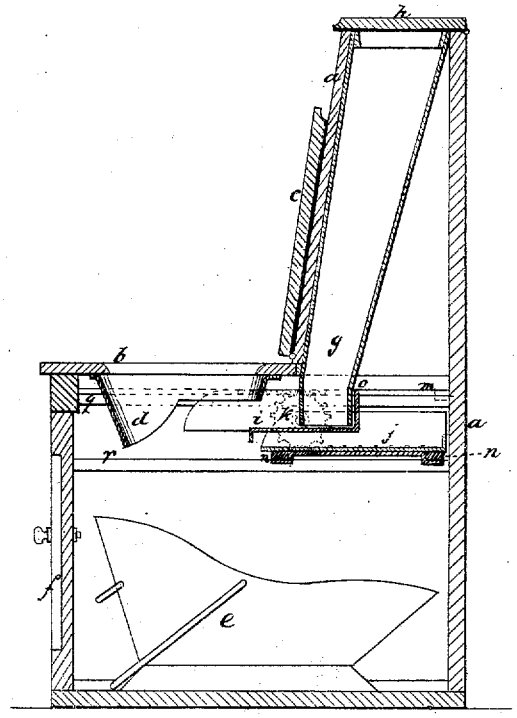

At Figure 1 I have shown, in vertical sectional elevation, a portable earth-closet or a "commode" embracing my invention. At Fig. 2 is a vertical section of the same at the line *x x*, Fig. 1. At Fig. 3 is a sectional view of the same, similar to Fig. 1, but with the sliding platforms down in different positions.

In these figures, *a* is the box or case of the commode. *b* is the seat; *c*, the seat-cover; *d*, the guide-funnel or urine-shield, (or deflector;) and *e*, the receptacle or pail, which is placed in the lower part of the case, (immediately below the seat,) and which may be removed to be emptied and replaced through the usual door *f* in the front of the lower portion of the commode. *g* is a hopper adapted to receive and contain the supply of dry powdered earth or clay, and which receives its said supply through a lid or hinged cover, *h*. At its top, *i* and *j*, are two platforms, which are arranged one over the other and about parallel to each other and to the seat, as clearly shown. These platforms *i* and *j* are provided, respectively, with cross-bars *m* and *n*, which rest and slide freely on the supporting guides or ways *q* and *r*, and these bars (or frames) *m* and *n* are provided at *o* and *p* with racks, with both of which engage the teeth of a spur-gear or pinion, *k*. This gear *k* has its shaft arranged in one side of the case *a* and is provided with a suitable handle at *l*, by means of which the occupant of the commode is enabled to operate the apparatus, as will be presently explained. Each of the platforms *i* and *j* is represented with sides, except in front, where they are left open, as illustrated. The upper platform *i* should be arranged so as to be capable of sliding back far enough to open the lower end or throat of the hopper *g* and permit the escape, onto the other platform *j*, of a small portion of the contents of said hopper *g*. And the two platforms and their racks *o p* should be so arranged with the gear *k* and each other that when platform *i* is moved forward platform *j* will move backward to the same extent, the two assuming about the position seen in Fig. 3. The front edge of the upper platform *i* does not move close over the top surface of *j*, but runs slightly above said surface of *j*, as seen at *i''*, in such a manner that a thin layer of the powdered earth will remain always on the top surface of *j*, as and for the purposes to be presently explained.

The operation of the apparatus may be thus explained: Suppose the parts to be adjusted to their normal position as seen at Fig. 1. In this position of the parts the earth in the hopper *g* is resting partially on the platform *j* and a small quantity has fallen out from beneath the lower open end of *g*. The fecal matter is deposited on the forward portion of the upper surface of *j*, (which is supposed to be covered with a layer of earth,) and by turning the handle or crank *l* in a given direction the pinion *k* will impart to the racks *o p* and their respective platforms *i j* reciprocatory motions in opposite directions; the platform *j* recedes while *i* advances, and, pushing before it the charge of earth which has escaped from the hopper, the excrement is enveloped by the earth, and finally (by the continued motions of the platforms) the excrement and its covering of earth are pushed off at the front edge of *j* and fall into the receptacle *e*. The handle *l* should now be turned in the opposite direction to bring the platforms back to the positions from which they were moved, and make the apparatus ready for use again. It will be understood that when the platforms *i j* are brought back to the positions seen at Fig. 1 the earth in hopper *g* is again allowed to flow down onto *j* ready for the deodorization of another deposit, and that as the front edge $i''$ of the upper platform moves clear of the top surface of $j$ there will always be on said surface a thin layer of earth, onto which the deposit is made, and which effectually prevents any fouling up of the said platform $j$. The shield $d$ serves to guide and deflect the urine into the receptacle $e$, and it will be seen that in the use of the apparatus as described a given charge of earth will be carried to and placed over and around the deposit with certainty, and that the excrement will always be enveloped with the deodorant and discharged into the receptacle so as to avoid all unpleasant odor. In lieu of having the earth-distributing mechanism worked by a hand-lever, $l$, as described, the axis or shaft of gear $k$ may be connected with the movable lid $c$ or with a hinged depressible spring-seat, to render the apparatus automatic in its operation, after the fashion often adopted in water-closet mechanism. Instead of using the platforms as I have just described they may be set, before the use of the closet, in the position seen at Fig. 3, when the deposit of fecal matter will be made in the pan or receptacle $e$, and not onto platform $j$. Now, by turning the handle $l$ in first one and then the other direction, the platforms $i$ and $j$ will be first placed (as seen at Fig. 1) so as to permit a charge of earth to come from the hopper onto $j$, and then moved so as to have the earth pushed off of $j$ onto the excrementitious deposit in the pan $e$. I, however, deem the first-described mode of working the apparatus the best, as then the deposit, being always made on the platform $j$ at the same locality, is covered and deodorized with more certainty than when the deposits are made at different heights (as the pan $e$ fills) in the pan $e$. Another modification of my invention may be made by fixing the lower platform $j$ permanently in its most forward position, and having the upper platform $i$ act through its whole length to push forward the earth from the hopper $g$, and the excrement deposited upon it, so that they will fall off into the pan $e$.

Having sufficiently explained the construction and operation of my improved earth-closet to enable one skilled in the art to make and use my invention, what I claim therein as new, and desire to secure by Letters Patent, is—

1. A platform, $j$, adapted to serve as a temporary receptacle for the deposit each time the closet is used, in combination with the described means for supplying the earth to it.

2. In combination with the platform $j$ a sliding platform, $i$, arranged to clean off the deposit, as set forth.

3. In combination with the platform $j$ or temporary deposit-receptacle and a supply-hopper, $g$, the moving platform $i$, the whole arranged to operate substantially as and for the purposes set forth.

In testimony whereof I have hereunto set my hand and seal this 16th day of June, 1871.

GEO. E. WARING, JR. [L. S.]

In presence of—
EDMUND TWEEDY,
C. N. GAVITT.